R. B. FRISBEE.
NUT LOCK.
APPLICATION FILED FEB. 7, 1908.
914,132.
Patented Mar. 2, 1909.
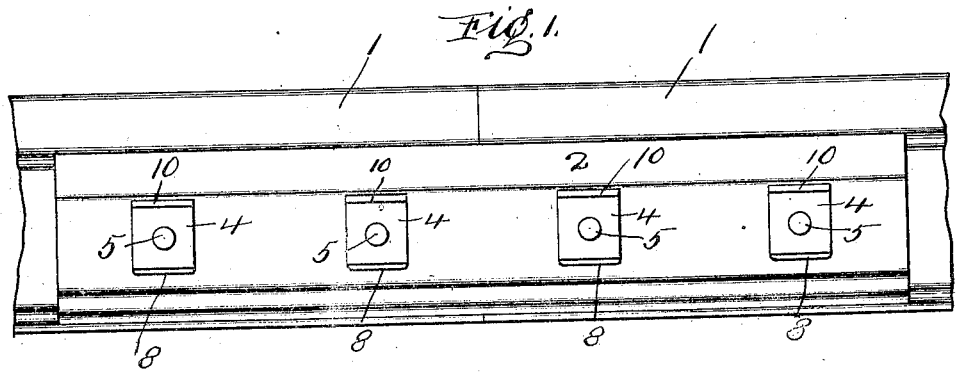
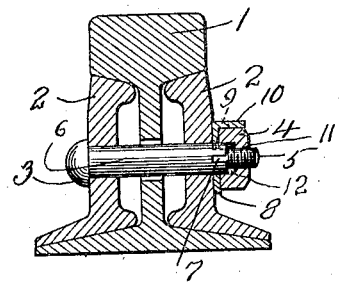
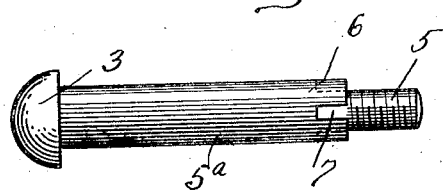
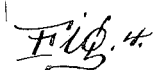
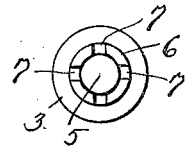
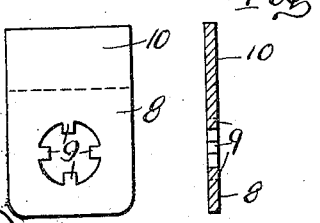
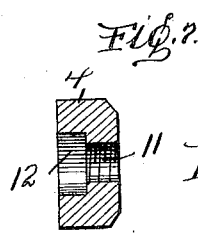
Witnesses
Inventor
R. B. Frisbee.
By
Attorneys

UNITED STATES PATENT OFFICE.

ROSWELL B. FRISBEE, OF VALENCIA, PENNSYLVANIA.

NUT-LOCK.

No. 914,132.   Specification of Letters Patent.   Patented March 2, 1909.

Application filed February 7, 1908. Serial No. 414,822.

*To all whom it may concern:*

Be it known that I, ROSWELL B. FRISBEE, a citizen of the United States of America, residing at Valencia, in the county of Butler and State of Pennsylvania, have invented certain new and useful Improvements in Nut-Locks, of which the following is a specification, reference being had therein to the accompanying drawing.

This invention relates to nut locks, and the primary object of my invention is, to provide positive and reliable means for holding a nut upon a bolt, whereby vibrations of the same cannot accidentally displace the nut.

Another object of this invention is to provide a simple, inexpensive and durable nut lock that can be easily and quickly placed in position to lock a nut upon a bolt.

My nut lock is particularly designed for rail joints and fasteners, wherein considerable trouble is experienced in retaining the nuts upon the bolts.

With the above and other objects in view which will more readily appear as the invention is better understood, the same consists in the novel construction, combination and arrangement of parts to be hereinafter described, and then specifically pointed out in the appended claim.

In the drawings: Figure 1 is an elevation of my nut lock, as applied to a rail joint, Fig. 2 is a cross sectional view of the same, Fig. 3 is an elevation of a bolt constructed in accordance with my invention, Fig. 4 is an end view of the same, Fig. 5 is an elevation of a locking washer constituting a part of my invention, Fig. 6 a vertical sectional view of the same, and Fig. 7 is a vertical sectional view of a nut constructed in accordance with my invention.

In the accompanying drawings, I have illustrated the confronting ends of two rails 1, these rails being secured together by splice bars 2 and a plurality of bolts 3 and 4, the bolts passing through the splice bars and the web portions of said rails. The bolts 3 are formed with reduced ends or threaded stems 5 to receive the nuts 4, and the shoulders 6 formed by the stem 5 are provided with oppositely disposed slots 7.

Each of the bolts 3 is formed with a reduced end 5 which is threaded, the reduced end 5 being of less length than the shank of the bolt. The latter is indicated by the reference character 5ª, is cylindrical in contour and at the terminus thereof which meshes into the reduced end is provided with a series of rectangular slots 7 whereby shoulders 6 are provided. The slots 7 are radially disposed and are arranged equidistant. Mounted upon each of the shanks 5ª and in proximity to the shoulders 6 is a rectangular washer 8 having its openings positioned at a point below the center thereof, the edge of the opening of the washer being formed with a series of equidistant spaced rectangular lugs 9 of less thickness than the length of the slots 7. The lugs 9 when the washer 8 is mounted upon the bolt are adapted to enter the slots 7 whereby rotative movement of the washer 8 upon the shank is prevented. By providing the opening in the washer below the center thereof, an extension 10 is formed which is adapted to be bent over to engage one of the faces of the nut 4, the latter being mounted upon the reduced screw-threaded end 5 of the bolt. This arrangement prevents rotative movement of the nut.

Each of the nuts 4 is formed with a screw-threaded opening 11 of less length than the width of the nut and each of the nuts 4 is furthermore provided with an annular recess 12 of greater diameter than the opening 11. The recesses 12 in the nuts 4 are adapted to receive the slotted ends of the shanks 5ª so as to allow the nuts 4 to engage the washers 8 and firmly hold these latter in engagement with one of the splice bars 2.

Since the washers are prevented from rotating by the bolts 3, the nuts 4 will be prevented from rotating upon the bolts by the extensions 10 of the washers engaging said nuts.

It is apparent that I have devised a simple and inexpensive nut lock that will not injure a nut or bolt and will allow a nut being removed at any desired time.

Having now described my invention what I claim as new, is:—

In a nut lock, a bolt comprising a shank formed of two different diameters, that portion of larger diameter having a smooth periphery and provided at one end with a series of equally spaced radial slots rectangular in contour, that portion of smaller diameter being screw-threaded, said portions of said shank being cylindrical throughout, a head formed integral with the other end of the shank, that portion of reduced diameter projecting from that end of the shank provided with the radial slots, a nut formed with a screw-threaded opening to engage the reduced screw-threaded portion of the bolt and further having an annular recess of greater diameter than said opening for the reception of the end of the slotted portion of the shank, and a washer mounted on the slotted portion of the bolt shank, the edge of the opening of the washer formed with a series of equi-distant spaced rectangular lugs engaging in the slots of the shank and of less thickness than the length of the slots, each face of the washer extending in the same plane throughout and said lugs extending in the plane of the edge of the opening of the washer.

In testimony whereof I affix my signature in the presence of two witnesses.

ROSWELL B. FRISBEE.

Witnesses:
W. J. HILL,
H. S. ORR.